(12) United States Patent
Barron et al.

(10) Patent No.: US 8,588,523 B2
(45) Date of Patent: Nov. 19, 2013

(54) METHOD AND APPARATUS FOR IMAGE SIGNAL PROCESSING

(75) Inventors: Euan James Barron, Tampere (FI); Mikko Juhana Muuki, Tampere (FI)

(73) Assignee: Nokia Corporation, Espoo (FI)

( * ) Notice: Subject to any disclaimer, the term of this patent is extended or adjusted under 35 U.S.C. 154(b) by 380 days.

(21) Appl. No.: 13/150,654

(22) Filed: Jun. 1, 2011

(65) Prior Publication Data

US 2012/0308130 A1   Dec. 6, 2012

(51) Int. Cl.
*G06K 9/00* (2006.01)

(52) U.S. Cl.
USPC ............................................. 382/167

(58) Field of Classification Search
None
See application file for complete search history.

(56) References Cited

U.S. PATENT DOCUMENTS

| | | | |
|---|---|---|---|
| 7,505,069 B2 * | 3/2009 | Wang | 348/223.1 |
| 2002/0196350 A1 * | 12/2002 | Cooper | 348/223.1 |
| 2005/0185066 A1 * | 8/2005 | Nishimura | 348/229.1 |
| 2006/0104505 A1 * | 5/2006 | Chen et al. | 382/162 |
| 2008/0025578 A1 * | 1/2008 | Nozawa | 382/118 |
| 2008/0259186 A1 | 10/2008 | Wang et al. | 348/238 |
| 2009/0091554 A1 * | 4/2009 | Keam | 345/175 |
| 2009/0190828 A1 * | 7/2009 | James | 382/162 |
| 2009/0268053 A1 | 10/2009 | Wang et al. | 348/229.1 |
| 2010/0165144 A1 * | 7/2010 | Lee | 348/229.1 |
| 2010/0295973 A1 * | 11/2010 | Aubuchon et al. | 348/241 |
| 2011/0157411 A1 * | 6/2011 | Hata | 348/229.1 |
| 2012/0200732 A1 * | 8/2012 | Takeuchi | 348/223.1 |

FOREIGN PATENT DOCUMENTS

WO   WO 2007/042853 A1   4/2007

* cited by examiner

*Primary Examiner* — Sean Motsinger
(74) *Attorney, Agent, or Firm* — Harrington & Smith

(57) ABSTRACT

In accordance with an example embodiment of the present invention, a method comprises generating at least one modified image representation of a subject image representation using at least one color shading adjustment, calculating at least one frequency of color ratio values for each of the at least one modified image representation, and determining one of said at least one modified image representation and the subject image based at least in part on the at least one frequency.

20 Claims, 4 Drawing Sheets

METHOD AND APPARATUS FOR IMAGE SIGNAL PROCESSING

TECHNICAL FIELD

The present application relates generally to a method and apparatus for image signal processing.

BACKGROUND

In recent years, digital camera technology has been regularly embedded in electronic devices such as mobile phones and computers. Camera technology embedded within electronic devices has increasingly included more sophisticated features such as image editing, filtering and automatic image correction.

One type of automatic image correction that may be embedded in digital cameras includes image correction for color shading. Color shading in digital cameras may occur when light is received at an angle at a light sensor instead of perpendicularly. Color shading may refer to a shift in color near the edges of a light sensor on a digital camera that is noticeable in a resulting digital camera image. Digital cameras may include embedded technology, which attempts to remedy the effects of color shading.

SUMMARY

Various aspects of examples of the invention are set out in the claims. According to a first aspect of the present invention, a method comprises generating at least one modified image representation of a subject image representation using at least one color shading adjustment, calculating at least one frequency of color ratio values for each of the at least one modified image representation and determining one of the at least one modified image representation and the subject image based at least in part on the at least one frequency.

According to a second aspect of the present invention, an apparatus comprises at least one processor and at least one memory including computer program code, the at least one memory and the computer program code configured with the at least one processor to cause the apparatus to perform at least generating at least one modified image representation of a subject image representation using at least one color shading adjustment, calculating at least one frequency of color ratio values for each of said at least one modified image representation and determining one of said at least one modified image representation and said subject image based at least in part on said at least one frequency.

According to a third aspect of the present invention, a computer program product comprises a computer-readable medium bearing computer program code embodied therein for use with a computer, the computer program code comprising code for generating at least one modified image representation of a subject image representation using at least one color shading adjustment, code for calculating at least one frequency of color ratio values for each of said at least one modified image representation, code for determining one of said at least one modified image representation and said subject image based at least in part on said at least one frequency.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1A:
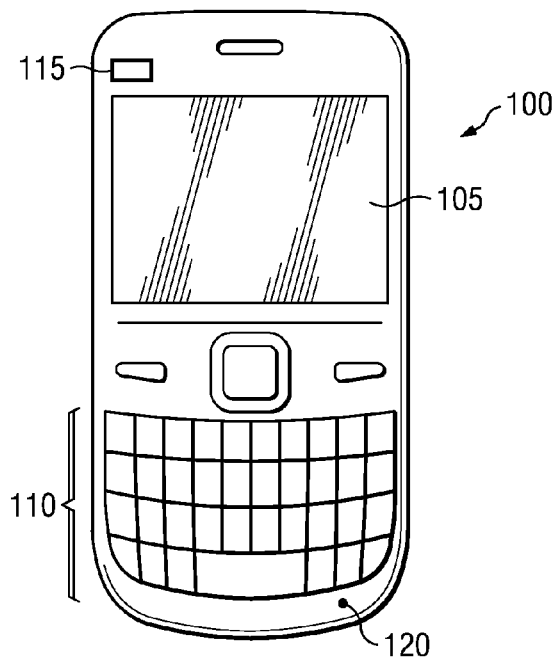
FIG. 1a is a diagram of an apparatus according to an example embodiment of the invention.

FIG. 1a is a diagram of an apparatus 100 according to an example embodiment of the invention. In an embodiment, apparatus 100 comprises a user interface to enable a user to interact with the apparatus 100 such as display 105 and keypad 110. Further, in an embodiment, apparatus 100 comprises a digital camera and/or video camera such as digital camera 115 for capturing images and/or video. Further, in an embodiment, apparatus 100 comprises a microphone such as microphone 120 for capturing audio.

Figure 1B:
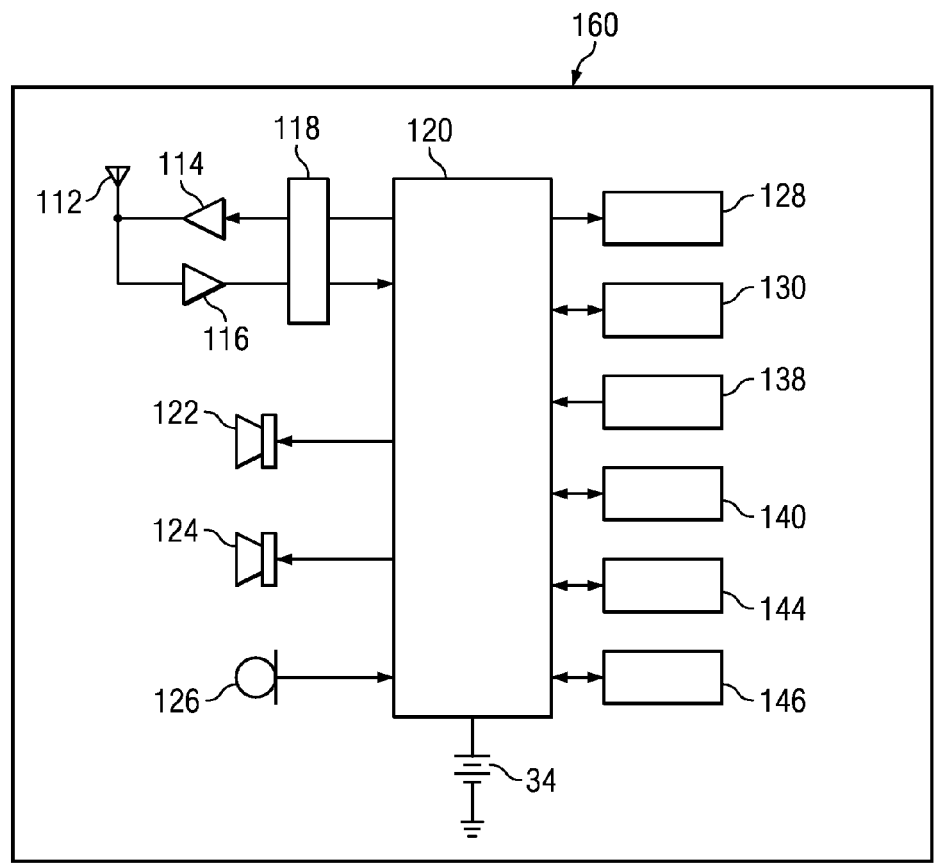
FIG. 1b is a block diagram of an apparatus according to an example embodiment of the invention.

FIG. 1b is a block diagram of an apparatus 160 according to an example embodiment of the invention. In an embodiment, an apparatus such as apparatus 160 comprises at least one antenna 112 in communication with a transmitter 114 and a receiver 116. Transmitter 114 and/or receiver 116 are connected with a network interface such as network interface 118 for transmitting and receiving signals. The apparatus 160 comprises a processor 120 and optionally one or more other processing components. The processor 120 provides at least one signal to the transmitter 114 and receives at least one signal from the receiver 116. In an embodiment, apparatus 160 further comprises a user interface that includes one or more input and/or output devices, such as a conventional earphone or speaker 124, a ringer 122, a microphone 126, a display 128, a keypad 130 and/or the like. Input and output devices of the user interface may be coupled with processor 120. In an embodiment, the display 128 is a touch screen, liquid crystal display, and/or the like. Keypad 130 may be used to compose text communications and provide other user input to apparatus 160.

In an example embodiment, the apparatus 160 further comprises a battery 134, such as a vibrating battery pack for powering various circuits to operate apparatus 160. In an embodiment, apparatus 160 further comprises volatile memory 138, such as random access memory (RAM). Volatile memory 138 may comprise a cache area for the temporary storage of data. Further, in an embodiment, the apparatus 160 further comprises non-volatile memory 140, which may be embedded and/or removable. The non-volatile memory 140 may also comprise an electrically erasable programmable read only memory (EEPROM), flash memory, and/or the like. In an embodiment, apparatus 160 may use memory to store any of a number of pieces of information and/or data to implement one or more features of the apparatus 160. Further, the memory may comprise an identifier, such as international mobile equipment identification (IMEI) code, capable of uniquely identifying the apparatus 160. The memory may store one or more instructions for determining cellular identification information based at least in part on the identifier. For example, the processor 120, using the stored instructions, may determine an identity, e.g., using cell identification information.

In an embodiment, processor 120 of apparatus 160 comprises circuitry for implementing one or more features of the apparatus. For example, the processor 120 may comprise at least one digital signal processor device, a microprocessor device, a digital to analog converter, other support circuits, and/or the like. Further, the processor 120 may comprise features to execute one or more software programs. For example, the processor 120 may be capable of operating a software program for connectivity, such as a conventional Internet browser. Further, the connectivity program may allow the apparatus 160 to transmit and receive Internet content, such as email messages, text messages, SMS messages, MMS messages, image data, video data, location-based content, web page content, and/or the like.

In an example embodiment, the apparatus 160 is capable of operating in accordance with any of a number of a first generation communication protocol, a second generation communication protocol, a third generation communication protocol, a fourth generation communication protocol, and/or the like. For example, the apparatus 160 may be capable of operating in accordance with second generation (2G) communication protocols IS-136, time division multiple access (TDMA), global system for mobile communication (GSM), IS-95 code division multiple access (CDMA), and/or the like. Further, the apparatus 160 may be capable of operating in accordance with third-generation (3G) communication protocols, such as Universal Mobile Telecommunications System (UMTS), CDMA2000, wideband CDMA (WCDMA), time division-synchronous CDMA (TD-SCDMA), and/or the like. Further still, the apparatus 160 may also be capable of operating in accordance with 3.9 generation (3.9G) wireless communication protocols, such as Evolved Universal Terrestrial Radio Access Network (E-UTRAN) and/or the like, or wireless communication projects, such as long term evolution (LTE) and/or the like. Still further, the apparatus 160 may be capable of operating in accordance with fourth generation (4G) communication protocols.

In an embodiment, apparatus 160 is capable of operating in accordance with a non-cellular communication mechanism. For example, apparatus 160 may be capable of communication in a wireless local area network (WLAN), other communication networks, and/or the like. Further, the apparatus 160 may communicate in accordance with techniques, such as radio frequency (RF), infrared (IrDA), any of a number of WLAN techniques. For example, the apparatus 160 may communicate using one or more of the following WLAN techniques: IEEE 802.11, e.g., 802.11a, 802.11b, 802.11g, 802.11n, and/or the like.

In an embodiment, apparatus 160 further comprises embedded digital camera technology such as digital camera module 144 and/or digital camera 115 of FIG. 1*a* for capturing digital images. In an embodiment, apparatus 160 further comprises an image adjustment unit such as image adjustment unit 146, which includes automatic image adjustment capability such as the capability to provide at least one image adjustment for color shading.

While embodiments of the apparatus 160 are illustrated and will be hereinafter described for purposes of example, apparatus 160 may include other modules and/or capabilities including but not limited to an electronic device such as a portable digital assistant (PDA), a pager, a mobile television, a gaming device, a video recorder, an audio player, a video player, a radio, a mobile telephone, a traditional computer, a portable computer device, a global positioning system (GPS) device, a GPS navigation device, a GPS system, a mobile computer, a browsing device, an electronic book reader, a combination thereof, and/or the like, may be used. While several embodiments of the invention may be performed or used by apparatus 160, embodiments may also be employed by a server, a service, a combination thereof, and/or the like.

Figure 2:
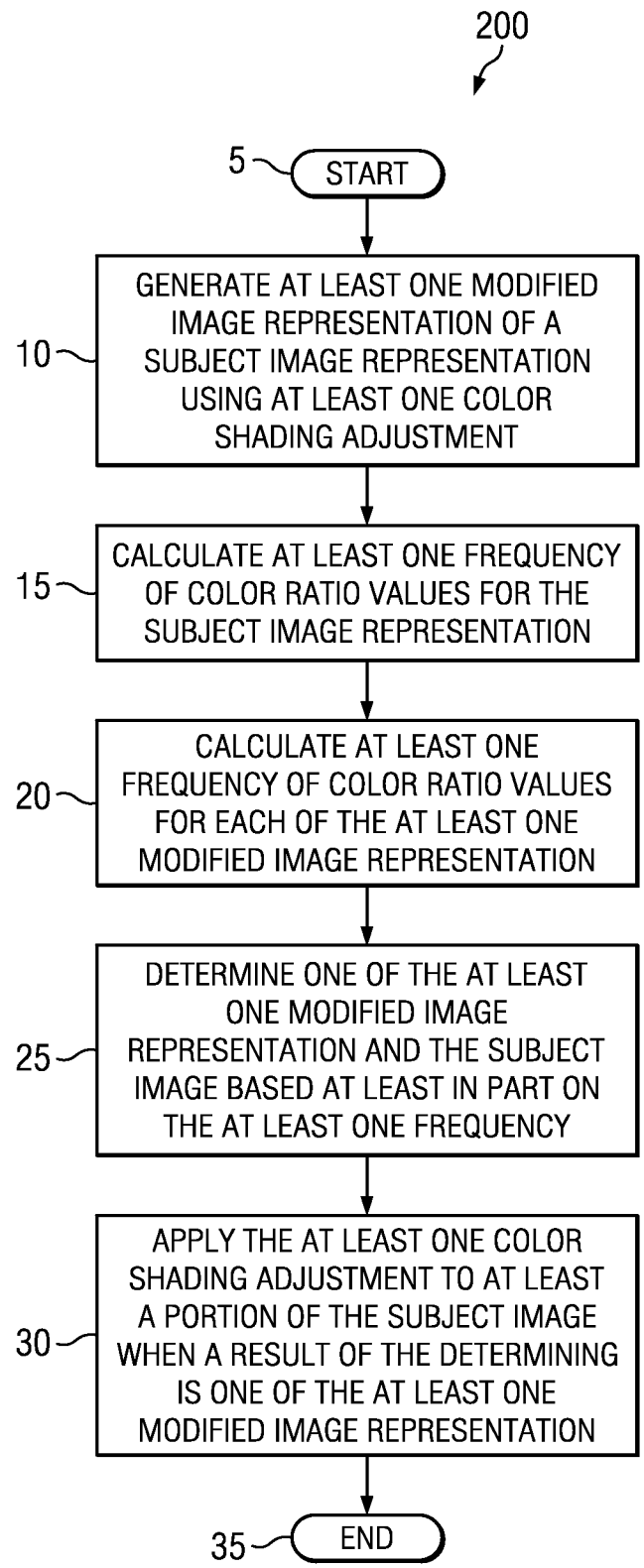
FIG. 2 is a flow diagram illustrating a method of image signal processing according to an example embodiment of the invention.

FIG. 2 is a flow diagram illustrating a method 200 of image signal processing according to an example embodiment of the invention. In an embodiment, the method begins at 5 and proceeds to 10. At 10, at least one modified image representation of a subject image representation is generated using at least one color shading adjustment. In an embodiment, a color shading adjustment provides a color shading correction to an image or image representation. In an embodiment, the subject image representation is an image representation in any image data format such as but not limited to the Joint Photographic Experts Group (JPEG) Format, Graphics Interchange Format (GIF), RAW format, Adobe DNG and/or the like. In an embodiment, the subject image or subject image representation is produced at least in part by a digital camera or digital camera module in an apparatus such as apparatus 160 of FIG. 1*b* and apparatus 100 of FIG. 1*a*. In another embodiment, the subject image is received via a network such as but not limited to the Internet.

In an embodiment, at 10, at least one color shading adjustment is used to generate the modified image representation of the subject image. Any one or more color shading adjustment approaches may be used to generate a modified image representation including but not limited to gain mapping, polynomial mapping, a model-based parametric approach including global and local color transfer approaches and/or the like.

In an embodiment, a color shading adjustment is performed on at least a portion of the subject image for one or more light spectrums such as but not limited to a halogen spectrum, fluorescent spectrum and/or daylight spectrum and a resulting modified image representation is generated. The color shading adjustment may be performed for a subset of pixels or the entire set of pixels of the subject image.

In an embodiment, at 10, color shading adjustments are performed on the subject image for the halogen and fluorescent spectrums and a modified image representation is generated for each color shading adjustment. In another embodiment, at 10, color shading adjustments are performed on the subject image for the halogen, fluorescent and daylight spectrums and a modified image representation is generated for each color shading adjustment. At 10, any number of color shading adjustments may be performed. Further, any one or more color shading adjustment approaches may be used to generate at least one modified image representation of the subject image. In an embodiment, the modified image representation comprises ratios of red to green and/or blue to green channel values for each pixel of the subject image in which a color shading adjustment is being performed.

In an embodiment, at 15, at least one frequency of color ratio values for a subject image is calculated. In an embodiment, each color ratio value corresponds to the ratio of a red color channel value to a green color channel value for each pixel of the subject image area. In another embodiment, at 15, each color ratio value corresponds to the ratio of a blue color channel value to a green color channel value for each pixel of the image area. In an embodiment, the image area is the same image area used at 10 to generate the at least one modified image representation of the subject image. In an embodiment, a portion of the subject image representation is used at 15 as long as the same portion of the at least one modified image representation is used in 20.

In an embodiment, calculation of at least one frequency of color ratio values for a subject image comprises determining a set of ranges of color ratio values and determining a number of color ratio values for each range of the subject image. In an embodiment, calculation of at least one frequency of color ratio values for a subject image comprises calculating each frequency of color ratio values for the subject image.

In an embodiment, a histogram or histogram representation of color ratio values for a subject image is determined by locating a set of ranges of color ratio values on a horizontal axis of the histogram and locating a frequency range of color ratio values on a vertical axis of the histogram. In the embodiment, each bar of a resulting histogram indicates a frequency of color ratio values for each range of color ratio values for a subject image.

In an embodiment, at 20, at least one frequency of color ratio values for each of the at least one modified image representation is calculated. In an embodiment, at 20, each color ratio value corresponds to the ratio of a red to green channel values for each pixel of the image area. In another embodiment, at 20, each color ratio value is a ratio of a blue to green color channel values for each pixel of the image area. In an embodiment, the image area for each of the at least one modified image representation is the same image area used at 10 to generate the at least one modified image representation of the subject image. In an embodiment, a portion of the at least one modified image representation is used at 20 as long as the same portion of the subject image representation is used in 15.

In an embodiment, calculation of at least one frequency of color ratio values for each of the at least one modified image representation comprises determining a set of ranges of color ratio values and determining a number of color ratio values for each range of each of the at least one modified image representation. In an embodiment, calculation of at least one frequency of color ratio values for the at least one modified image representation comprises calculating each frequency of color ratio values for the at least one modified image representation.

In an embodiment, a histogram or histogram representation of color ratio values is determined by locating the set of ranges of color ratio values on a horizontal axis of the histogram and locating a frequency range of color ratio values on a vertical axis of the histogram. In the embodiment, each bar of a resulting histogram indicates a frequency of color ratio values for each range of color ratio values.

In an embodiment, at 25, one of the at least one modified image representation and the subject image is determined based at least in part on the at least one frequency. In an embodiment, at 25, each frequency is calculated at 15. In another embodiment, at 25, each frequency is calculated at 15 and 20. In an embodiment, at least one frequency of color ratio values of the at least one modified image representation is compared with at least one frequency of color ratio values of the subject image. In the embodiment, the one of the at least one modified image representation and the subject representation is determined by determining the greatest frequency value across each of the ranges of color ratio values for each of the at least one modified image representation and the subject image. In an embodiment, if the subject image representation comprises the greatest frequency value compared with each of the frequency values for the at least one modified image representation then the subject image is determined. In an embodiment, if one of the modified image representations comprises the greatest frequency value including the frequency values of the subject image, then the modified image representation comprising the greatest frequency value is determined.

In another embodiment, at 25, the one of the at least one modified image representation and the subject representation is determined in part by determining the greatest frequency value across each of the ranges of color ratio values for each of the at least one modified image representation and the subject image. Further, in the embodiment, the at least one frequency value of adjacent ranges of color ratio values for a subject image representation and the at least one modified image representation is considered in the determination. In the embodiment, an image representation that has a combination of a greatest frequency of color ratio values and narrowest spread of frequencies is determined. In an embodiment, the determining further comprises choosing a modified image representation with a greatest frequency of similar color ratio values.

In an embodiment, at 30, a color shading adjustment is applied to at least a portion of the subject image when a result of the determining at 25 is one of the at least one modified image representation. The method ends at 35.

In an embodiment, an apparatus such as but not limited to apparatus 160 of FIG. 1*b* and apparatus 100 of FIG. 1*a* performs each of 10, 15, 20, 25 and 30 of FIG. 2. In the embodiment, an apparatus comprises at least one processor such as processor 120 of FIG. 1*b* and at least one memory such as volatile memory 138 of FIG. 1*b* including computer program code. In the embodiment, the at least one memory and the computer program code is configured with the at least one processor to cause the apparatus to generate at least one modified image representation of a subject image representation using at least one color shading adjustment, calculate at least one frequency of color ratio values for the subject image representation, calculate at least one frequency of color ratio values for each of the at least one modified image representation, and determine one of the at least one modified image representation and the subject image based at least in part on the at least one frequency. In an embodiment, the at least one memory and the computer program code is further configured with the at least one processor to cause the apparatus to apply the at least one color shading adjustment to at least a portion of the subject image when a result of the determining is one of the at least one modified image representation.

In an embodiment, a computer program product comprises code for performing each of 10, 15, 20, 25 and 30 of FIG. 2. In an embodiment, a computer program product comprises a computer-readable medium bearing computer program code embodied therein for use with a computer, the computer program code comprises code for generating at least one modified image representation of a subject image representation using at least one color shading adjustment, code for calculating at least one frequency of color ratio values for the subject image, code for calculating at least one frequency of color ratio values for each of the at least one modified image representation, code for determining one of the at least one modified image representation and the subject image based at least in part on said at least one frequency. In an embodiment, the computer program code further comprises code for applying the at least one color shading adjustment to at least a portion of the subject image when a result of the determining is one of the at least one modified image representation.

Figure 3A:
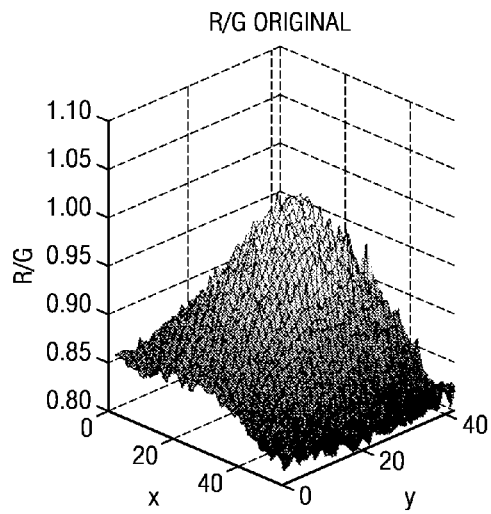
FIG. 3a is a graphical representation illustrating a ratio of red to green color channels for a set of pixels of a subject image according to an example embodiment of the invention.

FIG. 3a is a graphical representation illustrating a ratio of red to green color channels for a set of pixels of a subject image according to an example embodiment of the invention. In the embodiment, x and y axis of FIG. 3a indicate position of each pixel in the set of pixels for the subject image. In the embodiment, the vertical axis indicates the ratios of red to green color channels for each pixel of the subject image.

Figure 3B:
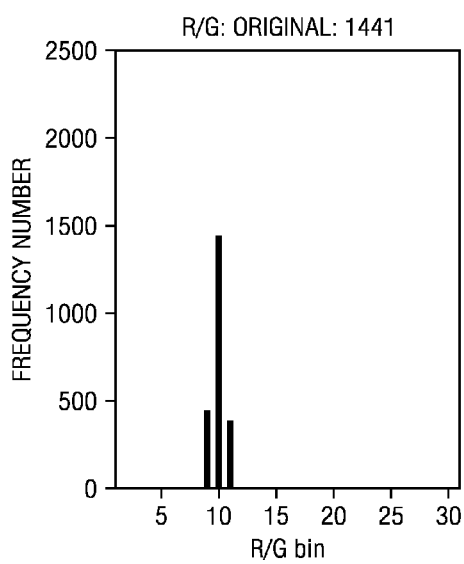
FIG. 3b is a histogram illustrating frequencies of ratios of red to green color channels for the subject image of FIG. 3a according to an example embodiment of the invention.

FIG. 3b is a histogram illustrating frequencies of ratios of red to green color channels for the subject image of FIG. 3a according to an example embodiment of the invention. In the embodiment, the horizontal axis indicates ratios of red to green color channels. The vertical axis indicates frequencies of ratios of red to green color channels. In the embodiment, each bar represents a frequency of red to green color ratios for a range of red to green color ratios. In an embodiment, FIG. 3b illustrates a calculation of at least one frequency of color ratio values for a subject image as described at 20 of FIG. 2.

Figure 4A:
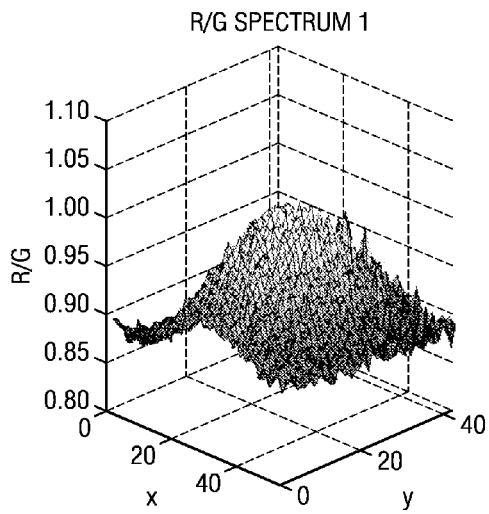
FIG. 4a is a graphical representation illustrating a ratio of red to green color channels for a set of pixels of a first modified image according to an example embodiment of the invention.

FIG. 4a is a graphical representation illustrating a ratio of red to green color channels for a set of pixels of a first modified image according to an example embodiment of the invention. In an embodiment, FIG. 4a indicates a representation of a subject image modified using at least one color shading adjustment. In FIG. 4a, R/G Spectrum 1 indicates at set of ratios for a color shading adjustment for a particular light spectrum such as but not limited to the halogen spectrum, daylight spectrum and florescent spectrum.

Figure 4B:
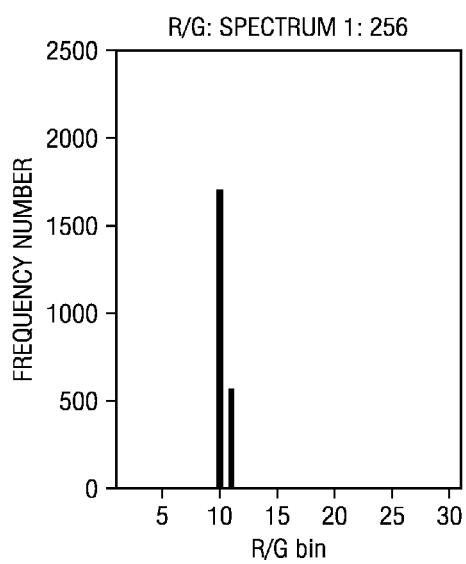
FIG. 4b is a histogram illustrating frequencies of ratios of red to green color channels for the first modified image of FIG. 4a according to an example embodiment of the invention.

FIG. 4b is a histogram illustrating frequencies of ratios of red to green color channels for the first modified image of FIG. 4a according to an example embodiment of the invention. In the embodiment, the horizontal axis indicates ratios of red to green color channels. The vertical axis indicates frequencies of ratios of red to green color channels. In the embodiment, each bar represents a frequency of red to green color ratios for a range of red to green color ratios. In an embodiment, FIG. 4b illustrates a calculation of at least one frequency of color ratio values for one modified image representation as described at 15 of FIG. 2.

Figure 5A:
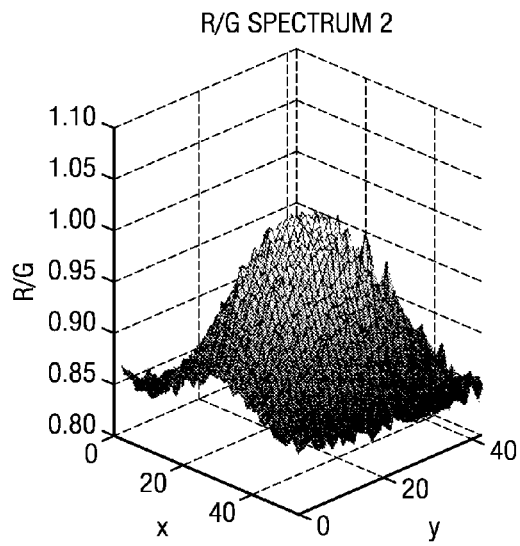
FIG. 5a is a graphical representation illustrating a ratio of red to green color channels for a set of pixels of a second modified image according to an example embodiment of the invention.

FIG. 5a is a graphical representation illustrating a ratio of red to green color channels for a set of pixels of a second modified image according to an example embodiment of the invention. In an embodiment, FIG. 5a indicates a representation of a subject image modified using at least one color shading adjustment. In FIG. 5a, R/G Spectrum 2 indicates at set of ratios for a color shading adjustment for a particular color spectrum such as but not limited to the halogen spectrum, daylight spectrum and florescent spectrum.

Figure 5B:
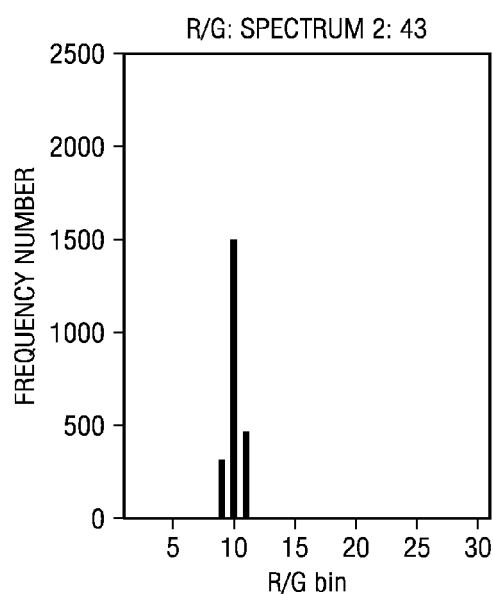
FIG. 5b is a histogram illustrating frequencies of ratios of red to green color channels for the second modified image of FIG. 5a according to an example embodiment of the invention.

FIG. 5b is a histogram illustrating frequencies of ratios of red to green color channels for the second modified image of FIG. 5a according to an example embodiment of the invention. In the embodiment, the horizontal axis indicates ratios of red to green color channels. The vertical axis indicates frequencies of ratios of red to green color channels. In the embodiment, each bar represents a frequency of red to green color ratios for a range of red to green color ratios. In an embodiment, FIG. 5b illustrates a calculation of at least one frequency of color ratio values for one modified image representation as described at 15 of FIG. 2.

Figure 6A:
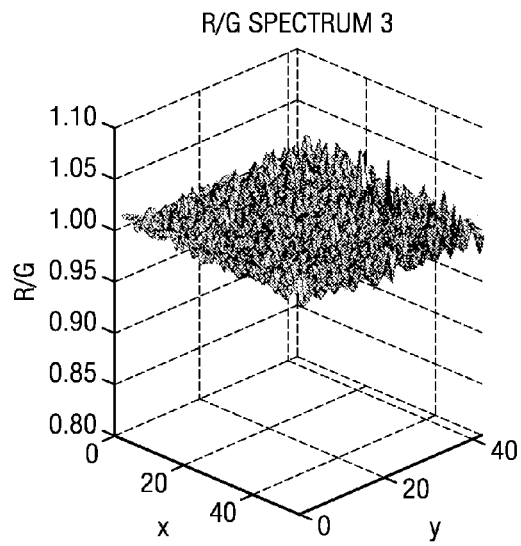
FIG. 6a is a graphical representation illustrating a ratio of red to green color channels for a set of pixels of a third modified image according to an example embodiment of the invention.

FIG. 6a is a graphical representation illustrating a ratio of red to green color channels for a set of pixels of a third modified image according to an example embodiment of the invention. In an embodiment, FIG. 6a indicates a representation of a subject image modified using at least one color shading adjustment. In FIG. 6a, R/G Spectrum 3 indicates at set of ratios for a color shading adjustment for a particular color spectrum such as but not limited to the halogen spectrum, daylight spectrum and florescent spectrum.

Figure 6B:
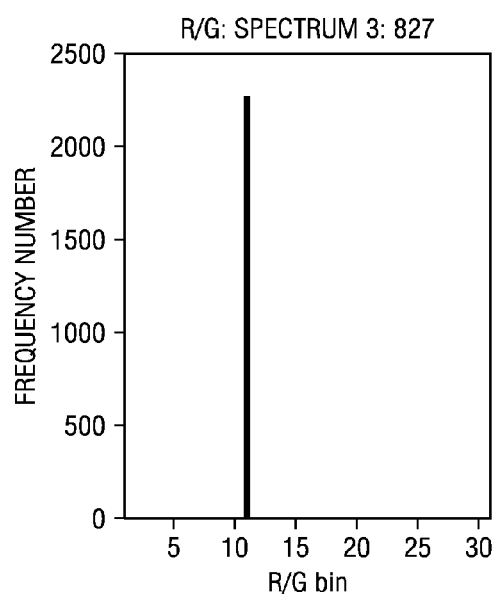
FIG. 6b is a histogram illustrating frequencies of ratios of red to green color channels for the third modified image of FIG. 6a according to an example embodiment of the invention.

FIG. 6b is a histogram illustrating frequencies of ratios of red to green color channels for the third modified image of FIG. 6a according to an example embodiment of the invention. In the embodiment, the horizontal axis indicates ratios of red to green color channels. The vertical axis indicates frequencies of ratios of red to green color channels. In the embodiment, each bar represents a frequency of red to green color ratios for a range of red to green color ratios. In an embodiment, FIG. 6b illustrates a calculation of at least one frequency of color ratio values for one modified image representation as described at 15 of FIG. 2.

In an embodiment, at 25 of FIG. 2, FIGS. 4b, 5b and 6b each represents a modified image representation indicating at least one frequency of ranges of color ratios for a different color spectrum. In an embodiment, at 25 of FIG. 2, the modified image representation of color shading adjustment for the R/G Spectrum 3 is determined since the greatest frequency of red to green color ratios is present for a particular range of color ratios.

Without in any way limiting the scope, interpretation, or application of the claims appearing below, a technical effect of one or more of the example embodiments disclosed herein is to provide color shading correction to digital and/or video images to significantly improve image quality in many lighting spectrums.

Embodiments of the present invention may be implemented in software, hardware, application logic or a combination of software, hardware and application logic. The software, application logic and/or hardware may reside on a processor, memory or other integrated circuit component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 1b. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   generating at least one modified image representation of a subject image representation using at least one color shading adjustment;
   calculating at least one frequency of color ratio values for each of said at least one modified image representation; and
   selecting one of said at least one modified image representation and said subject image based at least in part on said at least one frequency.

2. A method according to claim 1, further comprising calculating at least one frequency of color ratio values for said subject image.

3. A method according to claim 1, further comprising applying said at least one color shading adjustment to at least a portion of said subject image when a result of said selecting is one of said at least one modified image representation.

4. A method according to claim 1, wherein each of said color ratio values is a ratio of at least one of red-to-green color channels and blue-to-green color channels.

5. A method according to claim 1, wherein said selecting further comprises comparing at least one frequency of color ratio values of said at least one modified image representation with at least one frequency of color ratio values of said subject image.

6. A method according to claim 1, wherein said selecting further comprises choosing a modified image representation with a greatest frequency of similar color ratio values.

7. A method according to claim 1, wherein said subject image produced by a camera module.

8. An apparatus, comprising:
   at least one processor; and
   at least one memory including computer program code,
   the at least one memory and the computer program code configured with the at least one processor to cause the apparatus to perform at least the following:
   generating at least one modified image representation of a subject image representation using at least one color shading adjustment;
   calculating at least one frequency of color ratio values for each of said at least one modified image representation; and
   selecting one of said at least one modified image representation and said subject image based at least in part on said at least one frequency.

9. An apparatus according to claim 8, further comprising calculating at least one frequency of color ratio values for said subject image.

10. An apparatus according to claim 8, further comprising applying said at least one color shading adjustment to at least a portion of said subject image when a result of said selecting is one of said at least one modified image representation.

11. An apparatus according to claim 8, wherein each of said color ratio values is a ratio of at least one of red-to-green color channels and blue-to-green color channels.

12. An apparatus according to claim 8, wherein said selecting further comprises comparing at least one frequency of color ratio values of said at least one modified image representation with at least one frequency of color ratio values of said subject image.

13. An apparatus according to claim 8, wherein said selecting further comprises choosing a modified image representation with a greatest frequency of similar color ratio values.

14. An apparatus according to claim 8, wherein said subject image produced by a camera module of said apparatus.

15. A computer program product comprising a non-transitory computer readable medium bearing computer program code embodied therein for use with a computer, the computer program code comprising:
   code for generating at least one modified image representation of a subject image representation using at least one color shading adjustment;
   code for calculating at least one frequency of color ratio values for each of said at least one modified image representation; and
   code for selecting one of said at least one modified image representation and said subject image based at least in part on said at least one frequency.

16. A computer program product according to claim 15, further comprising code for calculating at least one frequency of color ratio values for said subject image.

17. A computer program product according to claim 15, further comprising code for applying said at least one color shading adjustment to at least a portion of said subject image when a result of said selecting is one of said at least one modified image representation.

18. A computer program product according to claim 15, wherein each of said color ratio values is a ratio of at least one of red-to-green color channels and blue-to-green color channels.

19. A computer program product according to claim 15, wherein said selecting further comprises comparing at least one frequency of color ratio values of said at least one modified image representation with at least one frequency of color ratio values of said subject image.

20. A computer program product according to claim 15, wherein said selecting further comprises choosing a modified image representation with a greatest frequency of similar color ratio values.

* * * * *